Oct. 6, 1931.  G. A. POTTER  1,825,819
LUBRICANT HEAT DISSIPATING DEVICE
Filed Nov. 29, 1930
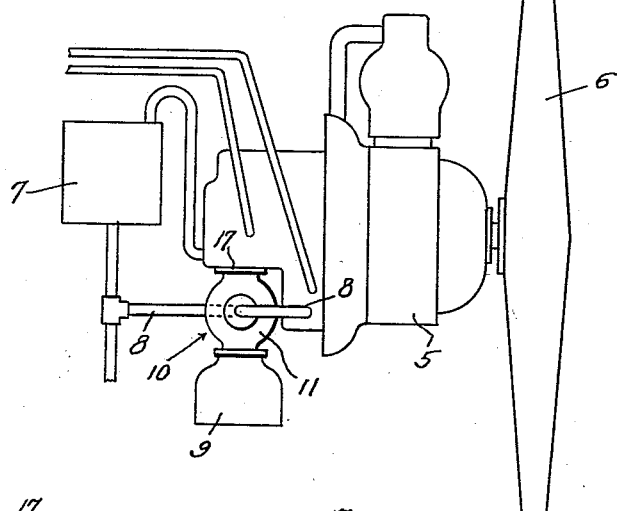
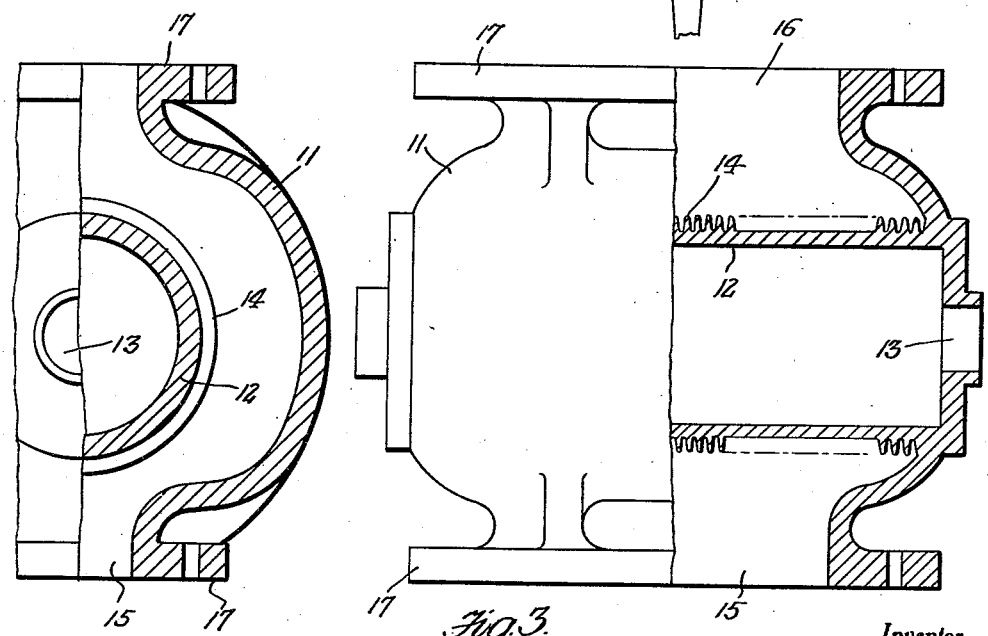
Inventor
George A. Potter,
By Clarence A. O'Brien
Attorney Patented Oct. 6, 1931

1,825,819

UNITED STATES PATENT OFFICE

GEORGE A. POTTER, OF DALLAS, TEXAS

LUBRICANT HEAT DISSIPATING DEVICE

Application filed November 29, 1930. Serial No. 499,053.

This invention relates to an article for installation on an engine for either cooling the lubricant supplied to the engine or heating the fuel supplied to the engine, depending upon the manner in which the same is connected to the fuel and lubricant lines.

During the course of the following specification, other objects and advantages will becomes apparent to the reader.

In the drawings:—

Figure 1 represents a side elevational view of an aeroplane engine equipped with the novel device.

Fig. 2 represents a fragmentary transverse sectional view of the device.

Fig. 3 represents a side elevational view of the device partly in section.

The drawings disclose only one adaptation of the device, that is to cool the lubricant by means of the passage of the fuel feed. However, it is to be understood that by reversing the device, so as to permit the oil return to pass through the device, the device is utilized as a heater for the fuel.

Referring to the drawings wherein like numerals designate like parts, it can be seen the numeral 5 represents an engine from which the drive shaft extends and is equipped with the propeller, as at 6 thereon. Numeral 7 represents the lubricant reservoir with numeral 8 representing the oil suction line from the reservoir to the engine.

Interposed between the usual carbureter 5 and the engine is the cooling device which is generally referred to by numeral 10. This device consists of a globe 11 having a conduit 12 extending across the interior thereof, the globe at each end of the conduit 12 being provided with an opening 13 to which the adjacent end of the suction line 8 can be communicated. The conduit 12 is provided with a plurality of circumferentially extending cooling fins as in the manner shown in Fig. 3.

It can also be seen in Fig. 3, that the globe is provided with a lower inlet opening 15 and an upper outlet opening 16 and both the bottom and top of the globe is blended as at 17, for connection to the carbureter 9 and the motor 5.

Obviously as the gas passes from the carbureter upwardly through the globe 11, heat will be dissipated from the oil passing through the conduits 12. This will act to the benefit of the fuel while dissipating heat from the lubricant.

While the foregoing specification sets forth the invention in definite terms, it is to be understood that numerous changes in the shape, size and materials may be resorted to without departing from the spirit and scope of the invention as claimed hereinafter.

Having thus described my invention, what I claim as new is:—

A lubricant cooling device for interposition between the carbureter and engine of the power plant comprising a globe having flanges upon two of its opposing sides connected to the engine and to a carbureter, a tubular member passing through the globe and having its axis located at right angles to the longitudinal axis of the globe, said tubular member projecting slightly beyond the sides of the globe and having its end closed, and a centrally arranged opening in each end for connection to a lubricant line both of the ends of the tubular member being formed integral with the sides of the globe and exterior fins formed on the tubular member.

In testimony whereof I affix my signature.

GEORGE A. POTTER.